(12) United States Patent
Helvie et al.

(10) Patent No.: US 11,830,012 B2
(45) Date of Patent: Nov. 28, 2023

(54) SYSTEM FOR U.S. CUSTOMS COMPLIANCE FOR OVERSEAS IMPORTERS

(71) Applicant: Target Brands, Inc., Minneapolis, MN (US)

(72) Inventors: Eric Helvie, Eagan, MN (US); Brenda Maurseth, Minneapolis, MN (US); Kyle LaShomb, Brooklyn Park, MN (US); Bindu Francis, Bangalore (IN)

(73) Assignee: Target Brands, Inc., Minneapolis, MN (US)

( * ) Notice: Subject to any disclaimer, the term of this patent is extended or adjusted under 35 U.S.C. 154(b) by 590 days.

(21) Appl. No.: 16/713,785

(22) Filed: Dec. 13, 2019

(65) Prior Publication Data
US 2020/0193450 A1 Jun. 18, 2020

Related U.S. Application Data

(60) Provisional application No. 62/779,136, filed on Dec. 13, 2018.

(51) Int. Cl.
| | |
|---|---|
| *G06Q 10/00* | (2023.01) |
| *G06Q 30/018* | (2023.01) |
| *G06Q 10/083* | (2023.01) |
| *G06Q 10/0831* | (2023.01) |

(52) U.S. Cl.
CPC ....... *G06Q 30/018* (2013.01); *G06Q 10/0831* (2013.01); *G06Q 10/0838* (2013.01)

(58) Field of Classification Search
CPC ............. G06Q 30/018; G06Q 10/0831; G06Q 10/0838
See application file for complete search history.

(56) References Cited

U.S. PATENT DOCUMENTS

| | | | |
|---|---|---|---|
| 7,312,702 B1 * | 12/2007 | Willms | G06Q 50/26 |
| | | | 705/333 |
| 7,406,472 B2 | 7/2008 | Manucha et al. | |
| 8,209,236 B2 | 6/2012 | Stone et al. | |
| (Continued) | | | |

FOREIGN PATENT DOCUMENTS

| | | | | |
|---|---|---|---|---|
| CN | 106845930 B | * | 4/2020 | ......... G06Q 10/0831 |
| EP | 2608074 B1 | * | 6/2019 | ........... G06F 16/215 |
| KR | 20030042177 A | | 5/2003 | |

OTHER PUBLICATIONS

"Progress made in assisting the trade industry in implementing new Importer Security Filing requirements". Biomedical Market Newsletter. (Nov. 1, 2010). (Year: 2010).*

*Primary Examiner* — Gabrielle A McCormick
(74) *Attorney, Agent, or Firm* — Merchant & Gould P.C.

(57) ABSTRACT

A computer-implemented method for complying with customs regulations for overseas shipments. The customs compliance systems and methods rely on current data to timely and accurately submit (or correct and resubmit) an "Importer Security Filing" or "ISF" to a U.S. Customs and Border Protection ("U.S. CBP") authority. In particular, the present systems retrieve (e.g., using various APIs) and rely on current data from the most accurate or up-to-date sources of such data. Moreover, each ISF record is handled independently, retrieving the current data as needed rather than in sequential, batched requests. As a result, errors and time for processing ISF submissions are reduced because accurate data is more readily and promptly available.

16 Claims, 8 Drawing Sheets

(56) References Cited

U.S. PATENT DOCUMENTS

| | | |
|---|---|---|
| 2002/0069096 A1 | 6/2002 | Lindoerfer et al. |
| 2003/0069831 A1 | 4/2003 | Le et al. |
| 2003/0182206 A1 | 9/2003 | Hendrix et al. |
| 2004/0124977 A1* | 7/2004 | Biffar ............... G08G 1/20 340/8.1 |
| 2005/0075941 A1 | 4/2005 | Jetter et al. |
| 2005/0187874 A1 | 8/2005 | Sanal |
| 2008/0255863 A1 | 10/2008 | Mack et al. |
| 2009/0089145 A1 | 4/2009 | Kent et al. |
| 2009/0125350 A1 | 5/2009 | Lessing et al. |
| 2011/0050397 A1 | 3/2011 | Cova |
| 2014/0236661 A1 | 8/2014 | Sherrill et al. |
| 2016/0300277 A1* | 10/2016 | Marlowe ............ G06Q 10/083 |
| 2018/0165643 A1* | 6/2018 | Coyle ............... G06Q 10/08 |
| 2018/0341910 A1* | 11/2018 | Broveleit ............ G06Q 50/28 |
| 2019/0332660 A1* | 10/2019 | Krissman ............ G06F 16/25 |
| 2020/0118068 A1* | 4/2020 | Turetsky ............ G06Q 30/018 |

\* cited by examiner

SYSTEM FOR U.S. CUSTOMS COMPLIANCE FOR OVERSEAS IMPORTERS

BACKGROUND

In order to comply with United States (U.S.) customs requirements, importing goods from overseas vendors or suppliers requires compiling and submitting current and accurate cargo data before the cargo is laden aboard an ocean vessel destined for the U.S. Failure to timely, accurately, and completely comply with these customs requirements may result in penalties, delayed permission to unlade the cargo, and even seizure of the cargo. Moreover, a merchandise processing fee ("MPF") must be paid on a per-entry basis; however, the fee is capped for a total entered value over a predetermined amount. In particular, U.S. Customs and Border Protection ("U.S. CBP") requires that importers of overseas goods file an electronic document referred to as an "Importer Security Filing" or "ISF" no less than 24 hours prior to lading. The ISF requires that the importer provide ten (10) items of information regarding a shipment, including eight (8) items of information no later than 24 hours prior to lading, and two (2) items of information as soon as possible, but not later than 24 hours prior to arrival at a U.S. port. Unfortunately, much of the data required for the ISF submission is generated by different entities at different times. Previous methods relied on batched data requests from a central entity that compiled data from the various other entities, resulting in delays and increasing the likelihood of relying on outdated data that was updated between batches. Additionally, sequential processing of ISF submissions required multiple round-trip requests to obtain data in response to U.S. CBP objections to incomplete or inaccurate data. Thus, previously it was difficult to comply with U.S. CBP requirements because the data required for ISF submission was often out-of-date or unavailable.

Accordingly, in order to provide U.S. CBP compliance, it is desirable to have access to timely and accurate data.

SUMMARY

In general, methods and systems for managing purchase documents (e.g., purchase orders, shipping notifications, etc.) and complying with U.S. CBP submissions for receiving overseas shipments are described. The methods and systems described herein leverage application programming interfaces ("APIs") to access to one or more external data sources to retrieve current data for overseas orders and shipments. In at least some embodiments, one or more of the external data sources is an ultimate source of the current data (e.g., an entity responsible for generating or relaying the current data to other entities). According to the methods described herein, due to the timely availability of current, accurate cargo data, ISF submissions can be made independently as data becomes available, without reliance on sequential, batched data requests. Additionally, by providing grouping logic, multiple purchase orders (POs) arriving on the same vessel may be consolidated into a single customs entry, enabling a higher percentage of entries to meet the total entered value cap. In this way, incremental savings of the MPF may be realized on a higher percentage of imported goods.

In an aspect, a method for complying with customs regulations for an overseas shipment is provided. The method includes receiving, at a software tool implemented on a computing system, current data including one or more of: a purchase order ("PO") number, a bill of lading ("BOL") number, one or more shipped item numbers, a shipped item quantity for each shipped item number, a ship to party, a vessel name, a ship from country, or an overseas carrier. Additionally, the method includes creating an importer security filing ("ISF") record, where the ISF record is based at least in part on the current data. The method further includes retrieving supplemental data by accessing at least one interface, where the supplemental data includes one or more of a PO corresponding to the PO number, where the PO comprising one or more ordered item numbers and an ordered item quantity for each ordered item; supplemental data of an overseas vendor; or supplemental data of an overseas carrier. Additionally, the method includes auditing record data of the ISF record based on the supplemental data and, when the record data matches the supplemental data, submitting an ISF to a U.S. customs authority.

In another aspect, a computing system for complying with customs regulations for an overseas shipment is provided. The computing system includes at least one processor communicatively coupled to at least one memory, the at least one memory storing computer-executable instructions comprising a software tool which, when executed, causes the computing system to perform a number of steps. For example, the computing system receives current data including one or more of: a purchase order ("PO") number, a bill of lading ("BOL") number, one or more shipped item numbers, a shipped item quantity for each shipped item number, a ship to party, a vessel name, a ship from country, or an overseas carrier. The computing system creates an importer security filing ("ISF") record, the ISF record based at least in part on the current data, and retrieves supplemental data by accessing at least one interface. The supplemental data includes one or more of a PO corresponding to the PO number, where the PO includes one or more ordered item numbers and an ordered item quantity for each ordered item; supplemental data of an overseas vendor; or supplemental data of an overseas carrier. The computing system further audits record data of the ISF record based on the supplemental data and, when the record data matches the supplemental data, submits an ISF to a U.S. customs authority.

In yet another aspect, a retail enterprise server configured for complying with customs regulations for an overseas shipment is provided. The retail enterprise server includes a computing system comprising at least one processor communicatively coupled to at least one memory, the at least one memory storing computer-executable instructions comprising a software tool which, when executed, causes the computing system to perform a number of steps. For example, the computing system receives a plurality of purchase order ("PO") numbers associated with a plurality of bill of lading ("BOL") numbers and determines that at least two POs are associated with a single entry. The computing system further consolidates the at least two POs to a single entry file and audits the consolidated entry file. The computing system then determines a merchandise processing fee ("MPF") for the consolidated entry file and creates a payment transaction for the MPF.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Figure 1:
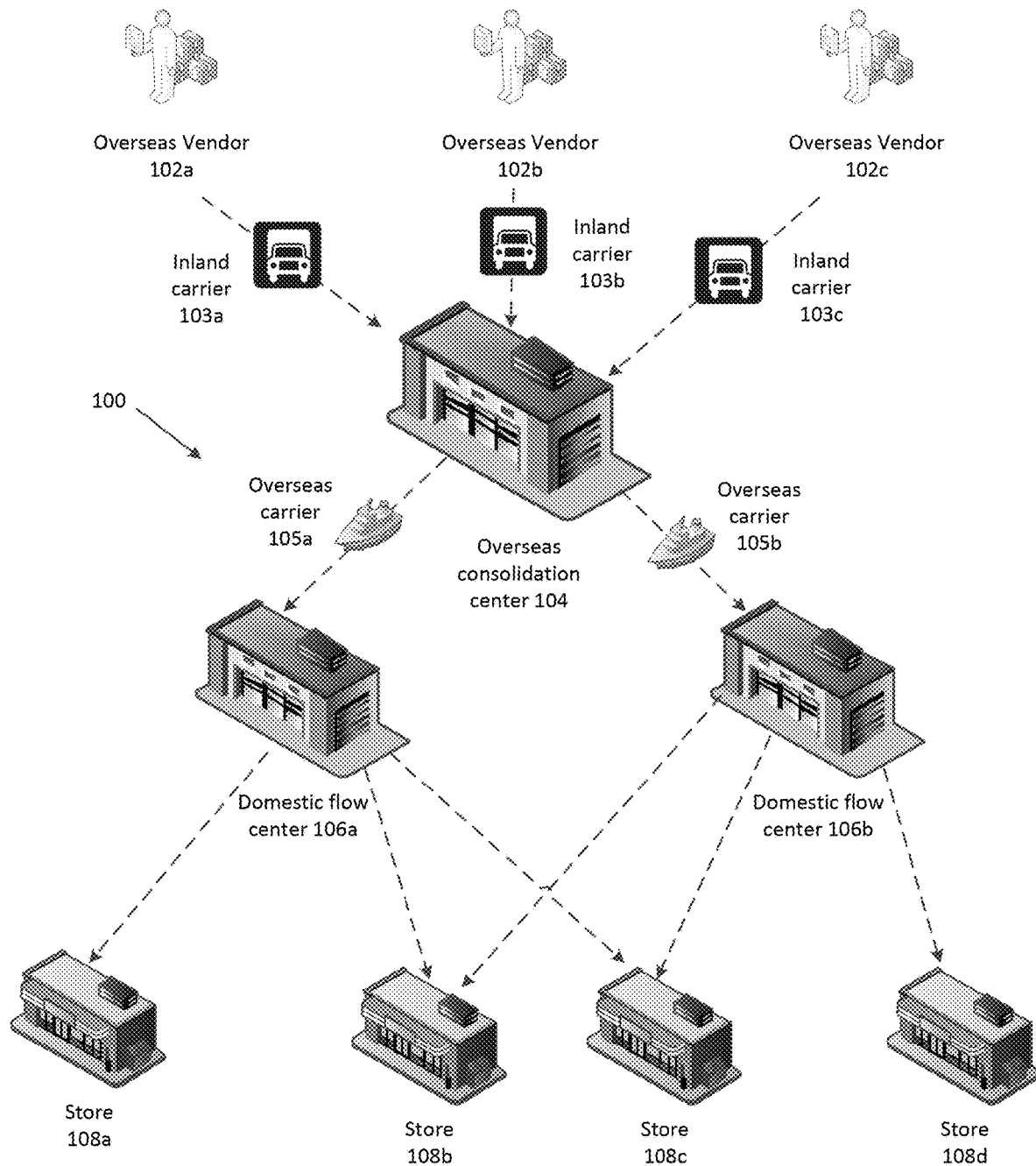
FIG. 1 illustrates a schematic diagram of an example supply chain for a retail enterprise.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general, the present disclosure describes U.S. CBP compliance systems and methods which rely on current data to timely and accurately submit (or correct and resubmit) an "Importer Security Filing" or "ISF." While this disclosure is generally described within the context of U.S. customs requirements, to the extent that the same or similar requirements are enacted and enforced by other sovereign nations, the innovations of this application are equally applicable and should not be limited in scope to the U.S. customs context. Unfortunately, much of the data required for the ISF submission is generated by different entities at different times. Previous methods for compiling data for ISF submissions relied on batched data requests to a central entity that compiled data from the various other entities, resulting in delays and increasing the likelihood of relying on outdated data that was updated between batches. Additionally, sequential processing of ISF submissions required multiple round-trip requests to obtain data in response to U.S. CBP objections to incomplete or inaccurate data. Rather, the present systems retrieve (e.g., using various APIs) and rely on current data from the most accurate or up-to-date sources of such data. Moreover, the present systems address each ISF record independently, retrieving the current data as needed rather than in sequential, batched requests. As a result, errors and time for processing ISF submissions are reduced because accurate data is more readily and promptly available.

FIG. 1 illustrates a schematic diagram of an example supply chain for a retail enterprise. The diagram 100 illustrates the flow of goods from overseas vendor(s) 102 to retail store(s) 108. Goods may include any item, product, raw material, and the like, which is ordered by the retail enterprise from the overseas vendor(s) 102. The goods move through various nodes to arrive at the retail store(s) 108. In this example, the nodes include three overseas vendors 102a/102b/102c, three inland carriers 103a/103b/103c, an overseas consolidation center 104, two overseas carriers 105a/105b, two domestic flow centers 106a/106b, and four retail stores 108a/108b/108c/108d. In practice, the supply chain could include many more nodes in different proportions. In some embodiments, there are more or fewer carriers, including both foreign and domestic inland carriers, overseas carriers, and/or air carriers. In additional or alternative embodiments, there are more overseas consolidation centers 104 and/or more or fewer domestic flow centers 106. Arrows in the diagram indicate movement of goods.

Overseas vendor(s) 102 produce the items or products that will be sold by the retail enterprise. A purchase order ("PO") is typically placed to request products from an overseas vendor. As detailed above, U.S. CBP requires that importers of overseas goods file an electronic document referred to as an "Importer Security Filing" or "ISF." In some cases, the overseas vendor 102 may be the best source for retrieving current data required for the ISF submission. For instance, the ISF requires the name and address (or a "widely recognized commercially accepted identification number") of the overseas vendor 102 by whom the goods are sold. Additionally, the ISF requires the name and address (or commercial identifier) of the entity that "last" manufactured, assembled, produced, or grew the commodity, or the supplier of finished goods in the origin country. Further, the ISF requires identification of the country of origin and the duty/statistical reporting number (i.e., commodity HTS-6 or HTSUS) for each item shipped. Thus, in order to comply with U.S. CBP, the importer must receive current data from overseas vendor 102 prior to the goods being shipped.

In some instances, the overseas vendor 102 will transport the ordered products (e.g., via inland carrier(s) 103) to the overseas consolidation center 104. In other instances, the retail enterprise may arrange for the products to be picked up from the overseas vendor(s) 102 and transported to the overseas consolidation center 104. The ISF submission also requires the name and address (or commercial identifier) for the entity that "stuffed" (loaded or caused to be loaded) the shipping container (e.g., the overseas consolidation entity). Additionally, the ISF requires the name and address (or commercial identifier) of the physical location where the goods were "stuffed" into shipping containers (e.g., the physical address of the overseas consolidation center 104). As detailed above, an ISF must be submitted to the U.S. CBP authority no later than 24 hours before cargo laden on an ocean vessel leaves the international port destined for the U.S. Therefore, current data from the overseas consolidation center 104 regarding an estimated departure time ("EDT") is necessary for determining when the ISF is due. Additionally, at least some of the items required for the ISF are due no later than 24 hour before arrival at the U.S. port. As such, current data regarding an estimated time of arrival ("ETA") or estimated day of arrival ("EDA") from the overseas carrier 105a/105b is also necessary for determining when additional information for the ISF is due.

In embodiments, an electronic "advance ship notice" ("ASN") may be generated for an overseas shipment of goods (e.g., by the overseas vendor 102, the overseas consolidation center 104, or the overseas carrier 105). The ASN may be received before or after an ISF file is created. For instance, the ASN may be in the form of an Electronic Data Interchange ("EDI") 856 (i.e., a ship notice/manifest). The EDI 856 may be used to populate information for the ISF submission. Even so, any data that is updated following generation of the EDI 856 must be retrieved from the entities identified above in order to make an accurate ISF submission.

Transit from the overseas consolidation center 104 may take many days to many weeks to even months depending on the distance from the overseas consolidation center 104 to the domestic flow center 106 and the type of carrier. Due to the extended transit time, any number of events may result in delaying or expediting the journey. Accordingly, the estimated time of arrival ("ETA") may be updated numerous times during transit. Again, as deadlines for submitting some information to the ISF are based on the ETA (i.e., no later than 24 hours prior to the ETA), current data regarding the ETA is necessary for complying with U.S. CBP requirements.

Domestic flow centers 106 are generally located at U.S. ports of entry and may include various warehouses or "distribution centers" for receiving and holding goods before distribution to retail stores. The ISF further requires information regarding a "Ship To Party," which is the first party scheduled to physically receive goods released from U.S. CBP. In particular, the ISF requires the name and address (or commercial ID) of the domestic flow center 106 scheduled to receive the shipment. Domestic flow center(s) 106 are typically positioned to enable quick shipment to one or more retail stores 108. Each domestic flow center 106 may supply the received items to multiple retail stores 108. In some instances, more than one domestic flow center 106 will send goods to a retail store 108.

From the domestic flow center(s) 106, goods may be further shipped to retail stores 108. In aspects, the retail enterprise may arrange for domestic inland carriers to transport goods from the domestic flow center(s) 106 to the retail store(s) 108. Once products arrive at the retail store(s) 108, they are available for in-store purchases, pick-up orders, or local delivery.

It is in this general supply chain retail environment that the following systems and methods operate. While the methods and systems are described in a retail environment having brick-and-mortar retail stores as well as online sales, additional applications are possible. For example, the systems and methods could operate in a supply chain of warehouses that only distribute products to customers in fulfillment of online orders.

Figure 2:
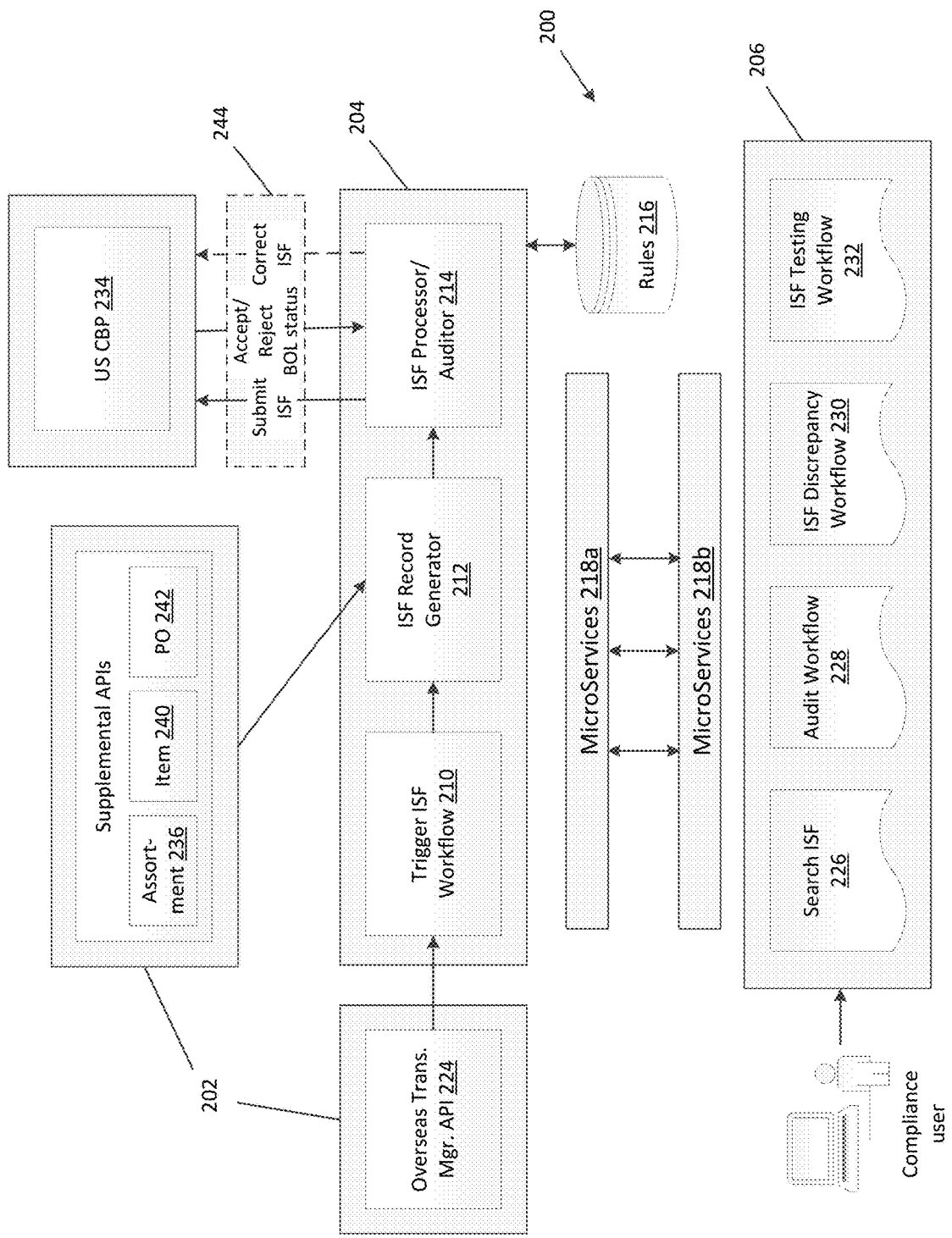
FIG. 2 illustrates an example block diagram of an example U.S. CBP compliance system 200 for processing overseas import shipments.

FIG. 2 illustrates a schematic diagram of an example U.S. Customs and Border Protection ("U.S. CBP") compliance system 200 for processing overseas import shipments. The components of the U.S. CBP compliance system 200 include one or more external interfaces 202 (including application programming interfaces, or "APIs," for retrieving current data from external sources), U.S. CBP compliance tool 204, optional ISF Processing Manager 244, and internal user interface 206. Together, the one or more external interfaces 202, U.S. CBP compliance tool 204, ISF Processing Manager 244, and internal user interface 206 operate to comply with U.S. CBP requirements for importing goods via ocean vessels. For example, the U.S. CBP compliance system 200 may generate, audit, submit, revise and/or re-submit an Importer Security Filing ("ISF") to U.S. CBP 234. Additionally, the U.S. CBP compliance system 200 may receive, audit, revise and/or submit an "Entry Summary" form (e.g., EDI 7501) for each entry of imported goods.

In some aspects (not shown), an advance ship notice ("ASN") (e.g., EDI 856) may be received from an overseas vendor, overseas consolidation center, overseas carrier, duty broker, or otherwise, at the customs compliance tool 204. For instance, the ASN may be received after ISF file generation but before submission or resubmission of the ISF to U.S. CBP. The ASN may include a number of details regarding a proposed shipment of goods, including a purchase order ("PO") number, a bill of lading ("BOL") number, one or more shipped item numbers, a shipped item quantity for each shipped item number, a "ship to" party, a vessel name, a "ship from" country, an overseas carrier, etc. As illustrated, the customs compliance tool 204 may include a number of stages or components. For instance, upon receipt, the ASN may be loaded into the customs compliance tool 204. Based on the ASN, the customs compliance tool 204 may populate at least some fields of an ISF record at Populate/Process ISF 214. While the ISF record may be populated with at least some of the details included in the ASN, the ISF record may also include additional data or information. For example, the ISF record may comprise data and information required for submitting an ISF to the U.S. CBP.

For instance, the customs compliance tool 204 may access one or more external interfaces 202 (e.g., application programming interfaces ("APIs")) to retrieve current data from external sources regarding the proposed shipment of goods. Current data may be defined as up-to-date data that reflects most-recent changes. Such current data may include current data from overseas vendors, overseas carriers, overseas consolidation centers, duty brokers or expeditors, and the like. The one or more external interfaces 202 for retrieving current data may include, for instance, an Overseas Transportation Manager ("OTM") API 224 and/or supplemental APIs including an Assortment API 236, an Item API 240, and a PO API 242.

The OTM API 224 may provide access to current data associated with the overseas vendor, including a name and address (or commercial ID) for the seller of the goods to be shipped (e.g., the overseas vendor), the name and address (or commercial ID) for the last manufacturer (or supplier) for each item to be shipped, the country of origin for each item to be shipped, the commodity number for each item to be shipped, the consolidator (or overseas consolidation center, "stuffer") responsible for loading (or arranging for loading) of the shipping containers for the goods, the physical location for consolidation ("stuffing") of the goods into the shipping containers, the name and address (or commercial ID) for the overseas carrier, and the estimated time of departure ("ETD"). Additionally, the OTM API 224 may provide access to current data of the overseas carrier. For example, the current data may include a list of items to be shipped, the name and address (or commercial ID) for the overseas carrier, the name of the vessel, the estimated time of departure ("ETD"), the estimated time of arrival ("ETA"), the destination port, the "ship to" party (e.g., domestic flow center), and the like.

In some aspects, the PO API 242 may provide access to current data regarding a purchase order for items ordered and/or shipped from the vendor (e.g., in the form of EDI 850) and may include any change orders to the PO (e.g., in the form of EDI 860). For instance, the PO API 242 may provide current data for a PO corresponding to the PO number referenced in an ASN. Such current data may include one or more ordered item numbers and a quantity for each ordered item. In other aspects, the Item API 240 and/or the Assortment API 236 may provide information regarding item numbers for items being shipped, item quantities for each item number, item countries of origin for each item, last manufacturer (or supplier) for each item, and the like. In still other aspects, the OTM API 224 may provide access to such current data regarding the PO and items to be shipped.

For each entry (including one or more POs), the importer must also file an entry form (or "Entry Summary" EDI 7501), which requires the importer to provide a filer code, an entry type, a bond type, a port code, an entry date, a country of origin, an importing carrier, an importer number, a total entered value, among others. In further aspects, a merchandise processing fee ("MPF") is charged for processing each entry form.

As should be appreciated, the external interfaces identified above, as well as other external interfaces, may be accessed by the customs compliance tool 204 at different times and for different reasons. Unlike previous systems, where data was often out-of-date and maintained across many different data owners, computer systems, applications, or storage locations, the present systems retrieve and rely on current data from the most accurate or up-to-date sources of such data. Not only so, but by utilizing various APIs, current data can be accessed on an as-needed basis. For instance, current data can be retrieved when an ASN is received, when an ISF record is generated by ISF Record Generator 212, when an ISF record is populated and/or audited at ISF Processor/Auditor 214, etc. Alternatively, current data can be retrieved from external interfaces 202 on a periodic or routine basis, or whenever new data is detected (e.g., by "pinging" the external sources via an API). In some cases, receipt of current data from an external interface (e.g., the OTM API 224) may trigger an ISF workflow 210 and ISF Record Generator 212 may create an ISF record. Some or all of the current data needed for populating the ISF record may be retrieved via the OTM API 224; additionally or alternatively, current data for populating the ISF record may be retrieved from Supplemental APIs including one or more of the Assortment API 236, the Item API 240, and/or the PO API 242.

In some aspects, current data from one external interface may be more accurate (or up-to-date) than current data from another external interface. For instance, while the overseas vendor may initially schedule shipping of the goods (and may maintain current data regarding the overseas carrier, ship to party, ETD, ETA, etc.), the overseas carrier may have more accurate information regarding the shipment, including the ship to party (e.g., revised based on deconsolidator load balancing, rerouting due to inclement weather, etc.), the ETA (e.g., revised due to inclement weather, rerouting, etc.), the vessel name (e.g., revised due to mechanical issues, load constraints, etc.). Thus, the customs compliance tool 204 may need to determine which "current data" retrieved from the various external sources is more accurate.

In this case, the customs compliance tool 204 may apply rules to the current data in order to identify data needed for the ISF and to determine which data is more accurate (or up-to-date). A rule may comprise a prioritization of current data based on the external source. For instance, an ETA from the overseas carrier may have a higher priority than an ETA from the overseas vendor; alternatively, a BOL number from the overseas vendor may have a higher priority than a BOL number from the PO. Another rule may prioritize current data with a later timestamp over current data with an earlier timestamp. As should be appreciated, any suitable rule may be used to determine which of the current data is likely to be more accurate.

After creation, the ISF record may be processed and/or audited by ISF Processor/Auditor 214. The ISF Processor/Auditor may operate in conjunction with an optional ISF Processing Management API 244. ISF Processing Management API 244 may be the same or different API than the OTM API 224. The ISF Processor/Auditor 214 of the customs compliance tool 204 may access the ISF Processing Management API 244 to audit, submit, correct, and/or resubmit an ISF to U.S. CBP 234. During this stage, the customs compliance tool 204 may retrieve current data via the ISF Processing Management API 244, which may have access to some or all of the current data available via the OTM API 224, the Assortment API 236, the Item API 240 and/or the PO API 242. Additionally or alternatively, the ISF Processing Management API 244 may access current data directly from external sources, including an overseas vendor, overseas consolidation center, overseas carrier, duty broker, or otherwise, for processing and submitting an ISF to U.S. CBP 234. In this stage, the customs compliance tool 204 may further retrieve current data to determine whether the ISF record comprises the most up-to-date information. Similar to the discussion above, the customs compliance tool 204 may apply rules to the data to determine which data is more current (e.g., based on data timestamps or other metadata). Additionally, the ISF Processor/Auditor 214, in conjunction with ISF Processing Management API 244, may identify discrepancies within the ISF record. For instance, the customs compliance tool 204 may identify improperly formatted data, incomplete data, conflicting data, and the like. When it is determined that the ISF record contains complete and accurate information, an ISF may be submitted to the US CBP 234.

After submission to the US CBP 234, the ISF may be accepted or rejected with comments. Rejection comments include one or more error codes indicating the particular deficiencies of the ISF. For instance, the ISF may be rejected for improperly formatted data, incomplete data, conflicting data, inaccurate or out-of-data data, or the like. Based on the error code, the customs compliance tool 204 may again retrieve current data from the external sources via the external interfaces 202 and/or ISF Processing Management API 244 in order to resolve the deficiencies. Upon updating the ISF, it may be resubmitted and will be either accepted or rejected with comments. This process continues until the ISF is accepted by US CBP 234. However, access to current data earlier in the process (e.g., when the ISF record is generated or processed/audited) enables the initial ISF submission to be more timely and accurate. Moreover, access to current data as needed (rather than based on batched and sequential processing) enables the customs compliance tool 204 to more quickly respond to deficiencies identified by US CBP 234 and resubmit the ISF. Thus, the ISF is much more likely to be accepted initially, or resolved more quickly, than was previously possible.

As further illustrated by system 200, the customs compliance tool 204 is accessed by the internal user interface 206. Internal user interface 206 enables users (e.g., internal compliance employees or "compliance users") to monitor, review, test, audit, and otherwise interact with the customs compliance tool 204. Internal user interface 206 may access the customs compliance tool 204 via a set of MicroServices 218a/218b. As used herein, a "MicroService" may refer to a service-oriented architecture in which applications are built or developed as a collection of smaller, discrete applications rather than as a single larger application. MicroServices 218a/218b may be associated with either or both of the customs compliance tool 204 and/or the internal user interface 206 to enable communication between the two components of system 200. As should be appreciated, the internal user interface 206 may access the customs compliance tool 204 via any suitable interface or application architecture either now known or later developed.

Internal user interface 206 may provide one or more windows (or graphical user interfaces) for interacting with the customs compliance tool 204. For instance, the internal user interface 206 may include one or more menus, toolbars, ribbons, or tabs for selecting different workflows associated with submitting an ISF. The selectable options may include, for example, an entry/ISF search 226, an audit workflow 228, an ISF discrepancy workflow 230, or ISF testing workflow 232. Upon receiving a selected option, the internal user interface 206 may provide a window (or graphical user interface) associated with the selection.

For instance, upon receiving a selection for an ISF search 226, the window may be tailored to provide different options and features for conducting a search of an ISF record. The search window may provide menus, toolbars, ribbons, or tabs with different options for searching ISF records. Options may include, for example, searching by PO number, ISF record number, BOL number, ISF status (e.g., incomplete, transmit, discrepancy), ETD, ETA, and the like. In providing functionality for performing the search, the internal interface 206 may also access the external interfaces 202 to obtain current data regarding any of the dates, numbers, etc., utilized as search criteria.

Alternatively, selection of an audit workflow 228 may launch windows tailored for conducting an audit of the ISF record. Such audit windows may also include menus, toolbars, ribbons, or tabs with different options for auditing the ISF record, such as for retrieving current data from external sources (e.g., via the one or more external interfaces 202 and/or ISF Processing Management API 244), for comparing record data with retrieved current data, and for identifying improperly formatted data, incomplete data, conflicting data, and the like.

Further still, selection of an ISF discrepancy workflow 230 may provide menu options for sorting ISF records (e.g., by discrepancy code, CBP error code, CBP status, submission deadline, etc.), for retrieving current data via external interfaces 202 and/or ISF Processing Management API 244 to resolve discrepancies, for manually or automatically applying fixes to the discrepancies (e.g., automatically applying proper number formatting, manually resolving conflicting data, etc.), for manually approving resubmittal of the ISF upon resolution of discrepancies, and the like. In this way, the internal user interface 206 provides an intuitive and simplified approach to resolving ISF discrepancies, thereby ensuring timeliness and accuracy of the ISF submission.

Moreover, the internal user interface 206 may provide for ISF testing scenarios via selection of the ISF testing workflow 232. For instance, the ISF testing workflow 232 may be conducted in a testing mode where the ISF record data is not actually altered, but where different scenarios may be run to determine possible outcomes. For instance, a different number format may be tested to determine whether an error is generated. Alternatively, a commercial ID for an overseas vendor may be verified through the testing workflow before submission. Here again, the internal user interface 206 provides testing and verification to ensure the timeliness and accuracy of the ISF submission.

In some embodiments the system 200 may be implemented by and/or in communication with one or more computing devices (not shown) over a network (not shown). In some cases, system 200 may be implemented over a distributed system of computing devices, storage resources, and networks (e.g., a cloud-based environment). The network(s) can be any of a variety of public and/or private communications networks, such as the Internet, an enterprise intranet or other private network, or any combination thereof. The computing device can be any network-connected device including a desktop computer, laptop computer, tablet computing device, smartphone, or any other device capable of connecting to the network through wireless or wired connections. An example computing architecture of system 200 will be further illustrated and described with respect to FIGS. 3 and 4.

As should be appreciated, the various devices, components, etc., described with respect to FIG. 2 are not intended to limit the systems and methods to the particular components described. Accordingly, additional topology configurations may be used to practice the methods and systems herein and/or some components described may be excluded without departing from the methods and systems disclosed.

Figure 3:
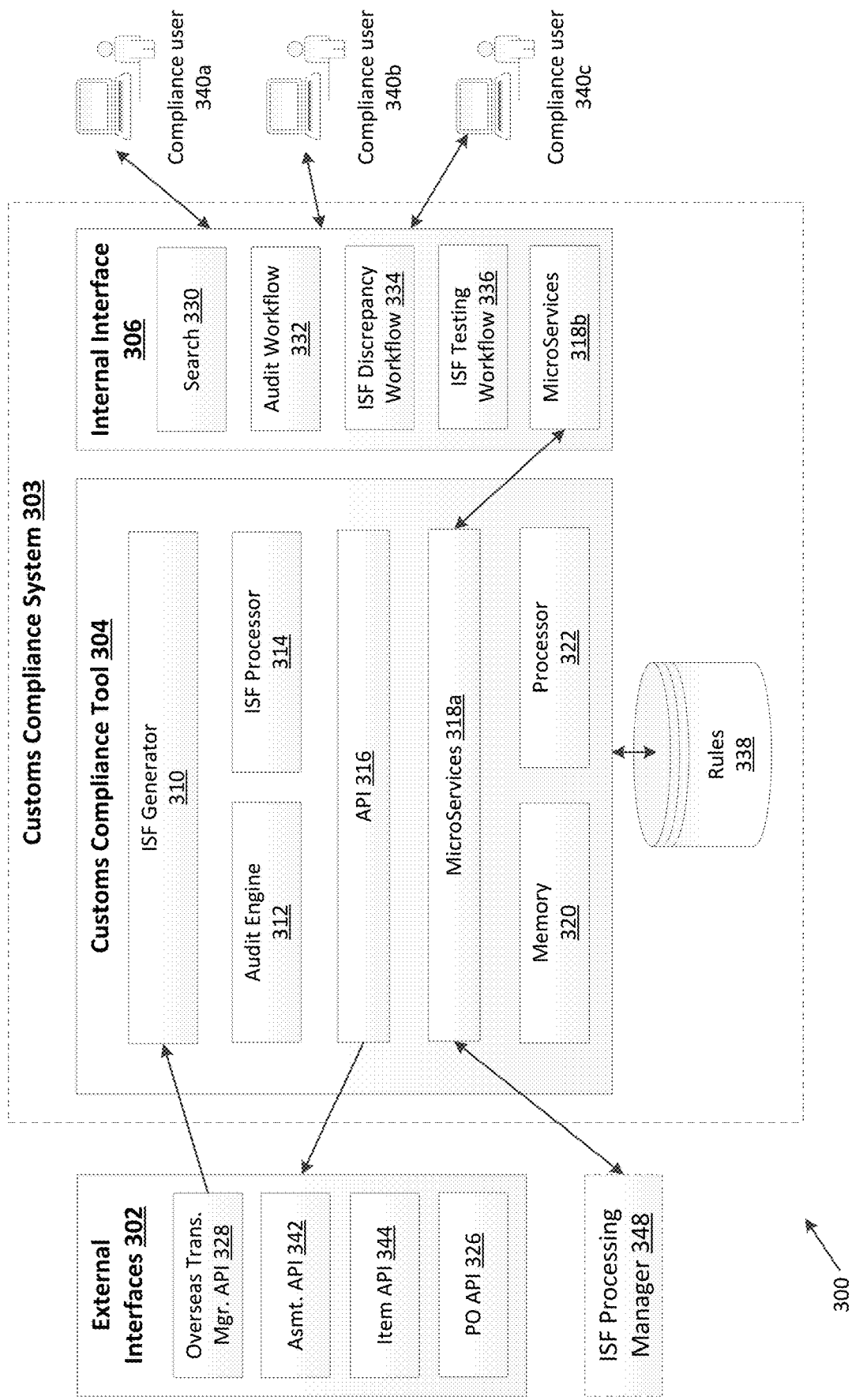
FIG. 3 illustrates an example block diagram of a computing system usable in the U.S. CBP compliance system of FIG. 2.

FIG. 3 shows a more detailed schematic of system 200. Computer system 300 includes a customs compliance system 303, which may be implemented by a retail enterprise and may include local components encompassed by a dashed line. The customs compliance system 303 may include a customs compliance tool 304, an internal interface 306, and a rule table 338. The customs compliance system 303 also includes a processor 322 and memory 320 operatively and communicatively coupled to the processor 322. One or more compliance users 340a/340b/340c may interact with the customs compliance system 303 via the internal interface 306, and the internal interface 306 may interact with the customs compliance tool 304 via MicroServices 318a/318b. Additionally, the customs compliance system 303 may communicate via API 316 with external interfaces 302, which interfaces may provide access to current data from external sources.

The customs compliance system 303 may receive current data from an Overseas Transportation Manager ("OTM") API 328. The current data may include a number of details regarding a proposed shipment of goods, including one or more of a purchase order ("PO") number, a bill of lading ("BOL") number, one or more shipped item numbers, a shipped item quantity for each shipped item number, a "ship to" party, a vessel name, a "ship from" country, an overseas carrier, etc. The receipt of current data may trigger the customs compliance tool 304 to generate an ISF record. For instance, ISF Generator 310 may generate and populate an ISF record with the received current data.

After creation of the ISF record, an audit engine 312 may then access one or more external interfaces 302 to retrieve any missing and/or additional current data from external sources in order to audit the ISF record. For instance, audit engine 312 may access an Assortment API 342, and Item API 344 and/or a PO API 326, and/or the OTM API 328. In some cases, auditing and processing an ISF record may be managed by an ISF Processing Manager 348, which may comprise a third-party entity that coordinates retrieval of missing and/or additional current data from the one or more external interfaces 302 and provides such current data to the audit engine 312 and/or the ISF processor 314. ISF Processing Manager 348 may be the same or different API than the OTM API 328. In some cases, the audit engine 312 may access rules table 338 to evaluate the ISF record to identify incomplete, improperly formatted, or conflicting data. The ISF record may then be passed to the ISF processor 314, which may identify and resolve any discrepancies in the ISF record and/or may run testing scenarios on the ISF to verify data and ensure proper formatting, etc.

The audit engine 312 and/or the ISF processor 314 may access the external interfaces 302 directly via API 316. Additionally or alternatively, as discussed above, audit engine 312 and/or ISF processor 314 may access the ISF Processing Manager 348 via API 316, and the ISF Processing Manager 348 may access external interfaces 302. As detailed above, the OTM API 328 may provide access to current data including a name and address (or commercial ID) for the seller of the goods to be shipped (e.g., the overseas vendor), the name and address (or commercial ID) for the last manufacturer (or supplier) for each item to be shipped, the country of origin for each item to be shipped, the commodity number for each item to be shipped, the consolidator (or overseas consolidation center, "stuffer") responsible for loading (or arranging for loading) of the shipping containers for the goods, the physical location for consolidation ("stuffing") of the goods into the shipping containers, the name and address (or commercial ID) for the overseas carrier, the estimated time of departure ("ETD"), the overseas vessel, the estimated time of arrival ("ETA"), the destination port, the "ship to" party (e.g., domestic flow center), and the like.

The PO API 326, the Assortment API 342, and/or the Item API 344 may provide access to current data corresponding to a PO number, including a list of items to be shipped, one or more ordered item numbers, a quantity for each ordered item, the name and address (or commercial ID) for the last manufacturer (or supplier) for each item to be shipped, the country of origin for each item to be shipped, the commodity number for each item to be shipped, and the like. As should be appreciated, the external interfaces 302 identified above, as well as other external interfaces, may be accessed by the ISF Processing Manager 348, audit engine 312 and/or the ISF processor 314 at different times and for different reasons.

As detailed above, current data may be retrieved in substantially real time when audit engine 312 and/or ISF processor 314 evaluate the ISF record. Alternatively, current data may be retrieved only when changes or updates are detected between the data reflected in the ISF record and the current data maintained by the external sources. In some cases, rather than retrieving current data in real time, the current data may be retrieved according to a predefined schedule (e.g., every night, every morning, every Monday, etc.) or may be retrieved any time changes are detected based on periodically pinging the one or more external interfaces 302. As should be appreciated, current data may be retrieved according to any of the methods described above or any combination thereof. After processing by the audit engine 312 and/or the ISF processor 314, when discrepancies or incomplete data have been resolved, an ISF based on the ISF record may be submitted to the US CBP. In aspects, the ISF may be submitted by the ISF processor 314 or the ISF Processing Manager 348.

As detailed above, compliance users 340a/340b/340c may access internal interface 306 to monitor, review, test, audit, and otherwise interact with the customs compliance tool 304. For instance, internal interface 306 may access the customs compliance tool 304 via a set of MicroServices 318a/318b. As should be appreciated, the internal interface 306 may access the customs compliance tool 304 via any suitable interface or application architecture either now known or later developed. Internal interface 306 may provide one or more windows for interacting with the customs compliance tool 304. For instance, the internal interface 306 may include one or more menus, toolbars, ribbons, or tabs for selecting different workflows associated processing an overseas shipment. The selectable options may include, for example, a search 330, an audit workflow 332, an ISF discrepancy workflow 334, or an ISF testing workflow 336.

Upon receiving a selected option, the internal interface 306 may provide a window (or graphical user interface) associated with the selection. For instance, upon receiving a selection for a search 330, the window may be tailored with menus, toolbars, ribbons, or tabs including different options for searching entry initiation files or ISF records. Options may include, for example, searching by PO number, ISF record number, BOL number, ISF status (e.g., incomplete, okay to transmit, discrepancy), ETD, ETA, and the like. In providing functionality for performing the search, the internal interface 306 may also access the external interfaces 302 to obtain current data regarding any of the dates, numbers, etc., utilized as search criteria.

Alternatively, selection of an audit workflow 332 may launch windows tailored for conducting an audit of ISF records. Such audit windows may also include menus, toolbars, ribbons, or tabs with different options for auditing the ISF record, such as for retrieving current data from external sources (e.g., via the one or more external interfaces 302), for comparing record data with retrieved current data, and for identifying improperly formatted data, incomplete data, conflicting data, and the like.

Selection an ISF discrepancy workflow 334 may provide menu options for sorting ISF records (e.g., by discrepancy code, CBP error code, CBP status, submission deadline, etc.), for retrieving current data via external interfaces 302 to resolve discrepancies, for manually or automatically applying fixes to the discrepancies (e.g., automatically applying proper number formatting, manually resolving conflicting data, etc.), for manually approving resubmittal of the ISF upon resolution of discrepancies, and the like. In this way, the internal interface 306 provides an intuitive and simplified approach to resolving ISF discrepancies, thereby ensuring timeliness and accuracy of the ISF submission.

Selection of the ISF testing workflow 336 may provide menu options for testing ISF records. For instance, the ISF testing workflow 336 may be conducted in a testing mode where the ISF record data is not actually altered, but where different scenarios may be run to determine potential outcomes. For instance, a different number format may be tested to determine whether an error is generated. Alternatively, a commercial ID for an overseas vendor may be verified through the testing workflow before submission. Here again, the internal interface 306 provides testing and verification to ensure the timeliness and accuracy of the ISF submission.

In some embodiments, the computing system 300 may be implemented over a network (not shown). For instance, computing system 300 may be implemented over a distributed system of computing devices, storage resources, and networks (e.g., a cloud-based environment). The network(s) can be any of a variety of public and/or private communications networks, such as the Internet, an enterprise intranet or other private network, or any combination thereof. Computing devices within the architecture of computing system 300 can be any network-connected device including a desktop computer, laptop computer, tablet computing device, smartphone, or any other device capable of connecting to the network through wireless or wired connections. An example computing architecture of computing system 300 will be further illustrated and described with respect to FIG. 4.

As should be appreciated, the various devices, components, etc., described with respect to FIG. 3 are not intended to limit the systems and methods to the particular components described. Accordingly, additional topology configurations may be used to practice the methods and systems herein and/or some components described may be excluded without departing from the methods and systems disclosed.

Figure 4:
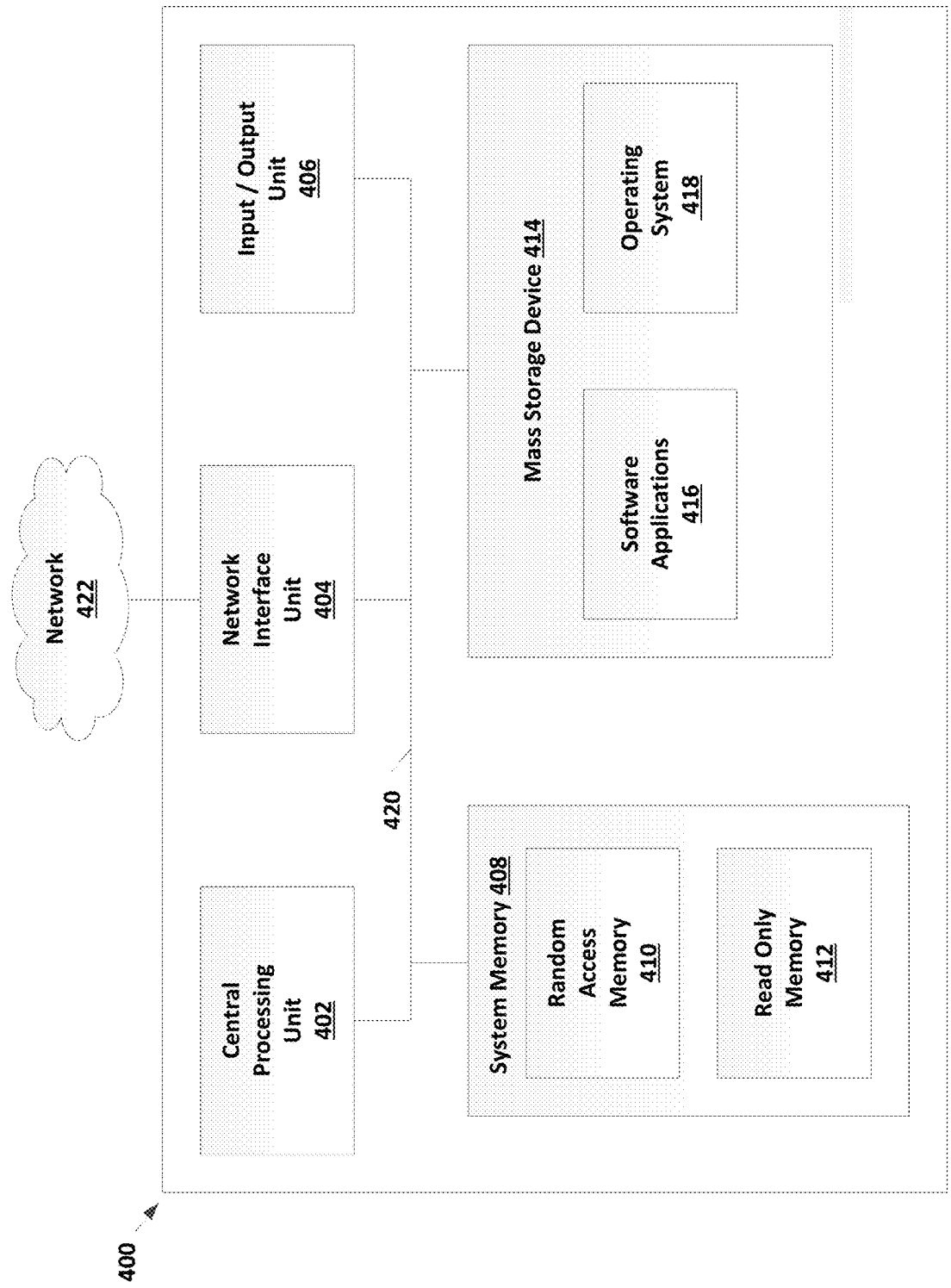
FIG. 4 illustrates an example block diagram of a computing system usable in the U.S. CBP compliance systems of FIGS. 2 and 3.

Referring now to FIG. 4, an example block diagram of a computing system 400 is shown that is useable to implement aspects of the customs compliance systems of FIGS. 2 and 3. In the embodiment shown, the computing system 400 includes at least one central processing unit ("CPU") 402, a system memory 408, and a system bus 420 that couples the system memory 408 to the CPU 402. The system memory 408 includes a random access memory ("RAM") 410 and a read-only memory ("ROM") 412. A basic input/output system that contains the basic routines that help to transfer information between elements within the computing system 400, such as during startup, is stored in the ROM 412. The computing system 400 further includes a mass storage device 414. The mass storage device 414 is able to store software instructions (e.g., software applications 416 and/or operating system 418) and other data.

The mass storage device 414 is connected to the CPU 402 through a mass storage controller (not shown) connected to the system bus 420. The mass storage device 414 and its associated computer-readable storage media provide non-volatile, non-transitory data storage for the computing system 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing system 400.

According to various embodiments, the computing system 400 may operate in a networked environment using logical connections to remote network devices through a network 422, such as a wireless network, the Internet, or another type of network. The computing system 400 may connect to the network 422 through a network interface unit 404 connected to the system bus 420. It should be appreciated that the network interface unit 404 may also be utilized to connect to other types of networks and remote computing systems. The computing system 400 also includes an input/output unit 406 for receiving and processing input from a number of other devices, including a touch user interface display screen, or another type of input device. Similarly, the input/output unit 406 may provide output to a touch user interface display screen or other type of output device.

As mentioned briefly above, the mass storage device 414 and the RAM 410 of the computing system 400 can store software instructions and data. The software instructions include an operating system 418 suitable for controlling the operation of the computing system 400. The mass storage device 414 and/or the RAM 410 also store software instructions (e.g., software applications 416), that when executed by the CPU 402, cause the computing system 400 to provide the functionality discussed in this document. For example, the mass storage device 414 and/or the RAM 410 can store software instructions that, when executed by the CPU 402, cause the computing system 400 to receive invoices and retrieve current data from external sources to process and reconcile the invoices for payment.

As should be appreciated, the various devices, components, etc., described with respect to FIG. 4 are not intended to limit the systems and methods to the particular components described. Accordingly, additional topology configurations may be used to practice the methods and systems herein and/or some components described may be excluded without departing from the methods and systems disclosed.

Figure 5:
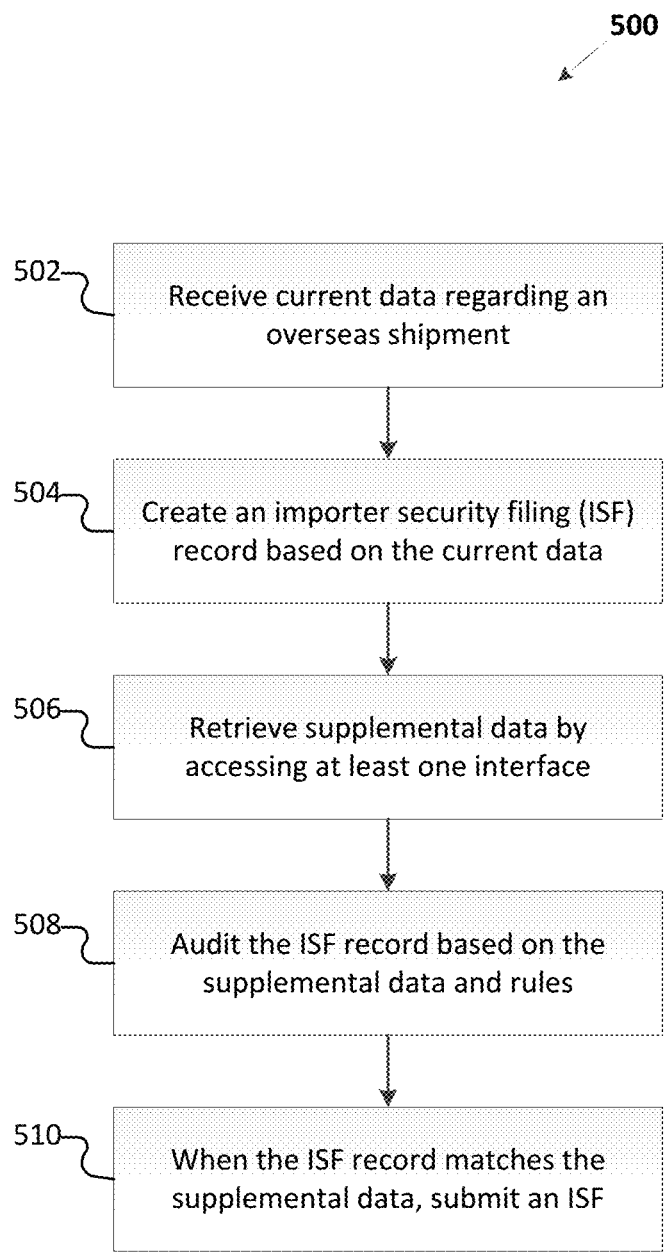
FIG. 5 provides a flow diagram of a method of improving accuracy and timeliness for submitting an ISF.

Referring now to FIG. 5, which provides a flow diagram of a method of improving accuracy and timeliness for submitting an ISF. For instance, the method of FIG. 5 may correspond to the system architecture for a customs compliance system described with respect to FIGS. 2 and 3.

At receive operation 502, current data may be received from an Overseas Transportation Manager ("OTM") API. The current data may include a number of details regarding a proposed shipment of goods, including a purchase order ("PO") number, a bill of lading ("BOL") number, one or more shipped item numbers, a shipped item quantity for each shipped item number, a "ship to" party, a vessel name, a "ship from" country, an overseas carrier, etc. Receipt of the current data may trigger an ISF workflow. For instance, the current data may be received and loaded into a software tool, such as the customs compliance tool 204/304, described above. In an example, the current data may include a BOL associated with one or more containers (e.g., a "Pre-Advanced Ship Notice," or "PreASN" container). Batching of PreASNs associated with a unique BOL/PO combination may be performed periodically, e.g., every hour, two hours, four hours, etc., or substantially continuously, e.g., as current data is received PreASNs may be batched with a BOL/PO combination. In response to batching the PreASNs, the ISF workflow may be triggered and an ISF record may be created at create operation 504.

At create operation 504, an importer security filing ("ISF") record may be created. For example, the ISF record may be populated with data and information required for submitting an ISF to the U.S. Customs and Border Protection ("U.S. CBP"). As noted above, ten (10) items of information are required to be submitted in an ISF prior to goods being laden on an ocean vessel destined for a U.S. port, namely: a seller of the goods (e.g., overseas vendor), a buyer of the goods (e.g., retail enterprise), an importer of record number, a consignee number (e.g., retail enterprise responsible for payment), a ship to party (e.g., domestic flow center responsible for taking possession of the goods when released from customs), a manufacturer (or supplier) of the goods, a country of origin for each shipped item, a commodity number for each shipped item, a consolidator (e.g., overseas consolidation center), and a consolidation location (e.g., physical location of the overseas consolidation center). As detailed above, the current data received from the OTM API may include some but not all of the information required for the ISF. Additionally, at least some information initially provided by the OTM API may be outdated, incomplete, or inaccurate by the time of filing the ISF. Accordingly, it is necessary to supplement the ISF record with additional, up-to-date data in order to comply with U.S. customs regulations.

At access operation 506, external sources may be accessed (e.g., via an API or via a third-party ISF manager) and supplemental data may be retrieved to determine whether the record data of the ISF record is accurate (e.g., still current). Additionally or alternatively, when the record data is identified as improperly formatted, missing, incomplete and/or inaccurate, supplemental data may be retrieved from external sources—either directly via various APIs or via a third-party ISF manager—and may be used to update the record data.

At audit operation 508, the ISF record may be audited. Auditing the ISF record may involve evaluating the record data based on one or more rules. For instance, the ISF record may be evaluated for properly formatted data, missing or incomplete data, inaccurate data, and the like. A rule may represent a prioritization of data based on the external source. For instance, an ETA from the overseas carrier may have a higher priority than an ETA from the overseas vendor; alternatively, a BOL number from the overseas vendor may have a higher priority than a BOL number from the PO. Another rule may prioritize data with a later timestamp over data with an earlier timestamp. As should be appreciated, any suitable rule may be used to determine which data is likely to be more accurate. Additionally, at operation 508, the record data may be compared to the supplemental data. For example, if the ISF record lists the ETA as 05/07/18, but the supplemental data from the overseas carrier lists the ETA as 05/08/18, the ISF record may be updated accordingly. In some cases, the compliance user may be required to approve such updates, in other cases the updates may be made automatically. For example, based on rules applied to the record data, supplemental data that is more recent may automatically replace older record data. In contrast, where retrieved data is conflicting (e.g., where data retrieved from the overseas vendor does not match data retrieved from the overseas carrier), the compliance user may be required to identify the correct data (e.g., after investigating the inconsistency).

At submit operation 510, when the record data of the ISF record matches the supplemental data, and any discrepancies have been resolved, the ISF may be submitted to U.S. CBP. As noted above, the ISF must be submitted no later than 24 hours prior to the goods being laden on an ocean vessel destined for a U.S. port. Accordingly, the more quickly current data can be retrieved and evaluated, and the more quickly the ISF record can be audited and verified, the more timely and accurate the ISF submission. As such, the present methods disclose retrieving current data as needed in real time (rather than in sequential batches), and handling ISF records independently (rather than in sequential batches). In this way, ISF records can be populated with current data as soon as it is available, rather than being required to wait for the next batch of data. Moreover, ISF records can be audited independently based on their respective deadlines, rather than in a batch with other ISF records. Similarly, as will be discussed further below, U.S. CBP rejections of a submitted ISF can be handled independently in order to meet response or correction deadlines. Thus, based on the presently described systems, ISF submission is improved with respect to timeliness, accuracy, and completeness.

As should be appreciated, operations 502-510 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 6:
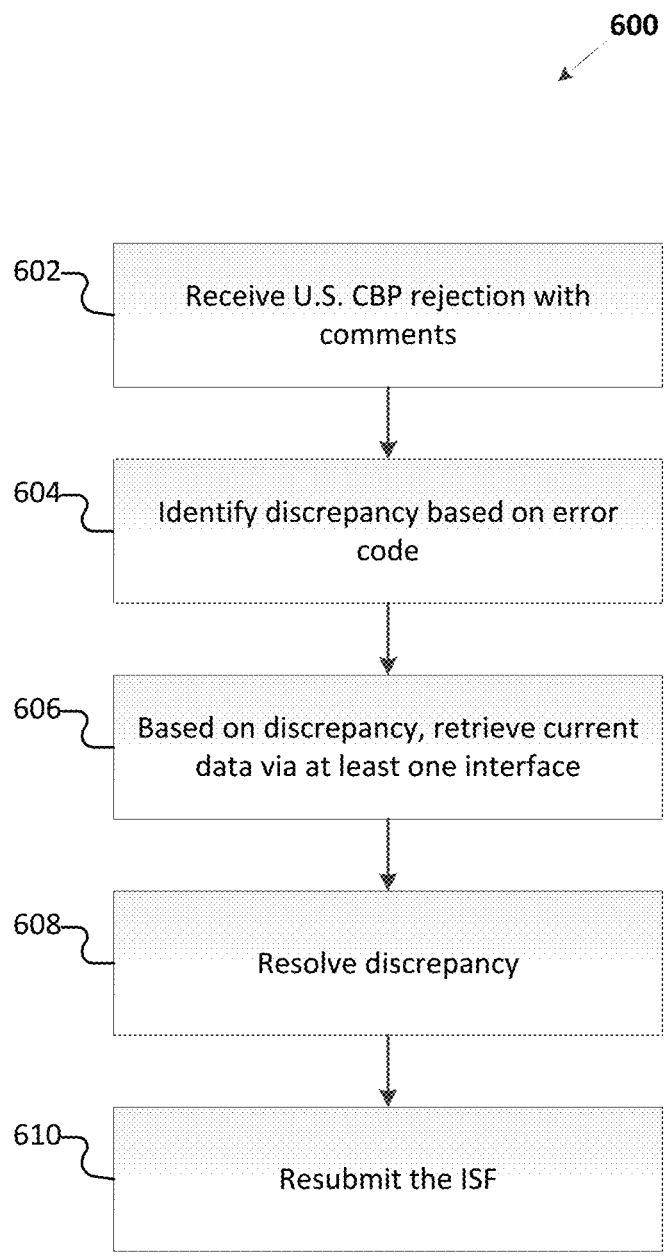
FIG. 6 provides a flow diagram of a method of improving accuracy and timeliness for correcting and resubmitting an ISF.

Referring now to FIG. 6, which provides a flow diagram of a method of improving accuracy and timeliness for correcting and resubmitting an ISF. For instance, the method of FIG. 6 may correspond to the system architecture for a customs compliance system described with respect to FIGS. 2 and 3.

At receive response operation 602, a response to an ISF submission may be received from the U.S. CBP. Upon submission of an ISF, the U.S. CBP may accept the ISF or reject the ISF with comments. When the U.S. CBP rejects the ISF, comments to the rejection may include one or more disposition or error codes. These codes may indicate the completeness or accuracy of the ISF. For instance, disposition code S1 indicates that there is a BOL on file that has been matched to the ISF. Alternatively, disposition codes S2-S5 indicate that there is no BOL on file matching the ISF and that the ISF will be canceled after a predetermined time period. There are a large number of error codes, each error code specifying a particular issue with the ISF data. For instance, error codes may range from an invalid submission type for the ISF, to invalid number formats, to missing or incomplete information. Upon receiving the U.S. CBP response, the importer has a limited time to comply.

At identify operation 602, a discrepancy may be identified based on the error code. For instance, error code S55 may indicate that the consolidator is missing, while error code S70 may indicate that the IRS format for a commercial ID is invalid, and while error code S91 may indicate that the country of origin is invalid. In this case, some discrepancies may indicate missing information, whereas other discrepancies may indicate invalid information (e.g., due to data formatting, or due to inaccuracy).

At retrieve operation 606, current (or supplemental) data may be retrieved from one or more external sources using different application programming interfaces ("APIs"). The current data may reflect the most up-to-date and accurate data available. For example, current data may be retrieved from the overseas vendor, overseas carrier, PO API, etc. Based on the discrepancy, the current data may be retrieved from a different external source. Continuing with the examples above, for a discrepancy indicating a missing consolidator, current data from the overseas vendor or the overseas carrier may be retrieved. Alternatively, for an invalid IRS format, the system may retrieve current data for the commercial ID in a proper format (e.g., from the overseas vendor or the overseas carrier, depending on the entity associated with the invalid commercial ID). For an invalid country of origin for a shipped item, current data may be retrieved from the overseas vendor.

At resolve operation 608, the discrepancy may be resolved based on the current data. Resolving the discrepancy may involve, for example, inputting missing information, reformatting invalid information, and/or correcting invalid information. Continuing with the examples above, a missing consolidator may be added, an improperly formatted commercial ID may be corrected, and an invalid country of origin may be updated.

At submit operation 610, upon resolving all error codes issued by the U.S. CBP, the ISF may be resubmitted. As noted above, the ISF must also be resubmitted in a timely fashion. Accordingly, the more quickly current data can be retrieved and evaluated, and the more quickly the ISF record can be updated or corrected to resolve discrepancies, the more timely and accurate the ISF resubmission. As such, the present methods disclose retrieving current data as needed (rather than in sequential batches), and handling a rejected ISF independently (rather than in sequential batches). In this way, the ISF can be updated and corrected immediately by accessing the current data as needed, rather than being required to wait for the next batch of data. Moreover, ISF rejections can be corrected independently based on their respective deadlines, rather than in a batch with other ISF rejections. Thus, both ISF submission, as well as ISF correction and resubmission, are improved with respect to timeliness, accuracy, and completeness.

As should be appreciated, operations 602-610 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7:
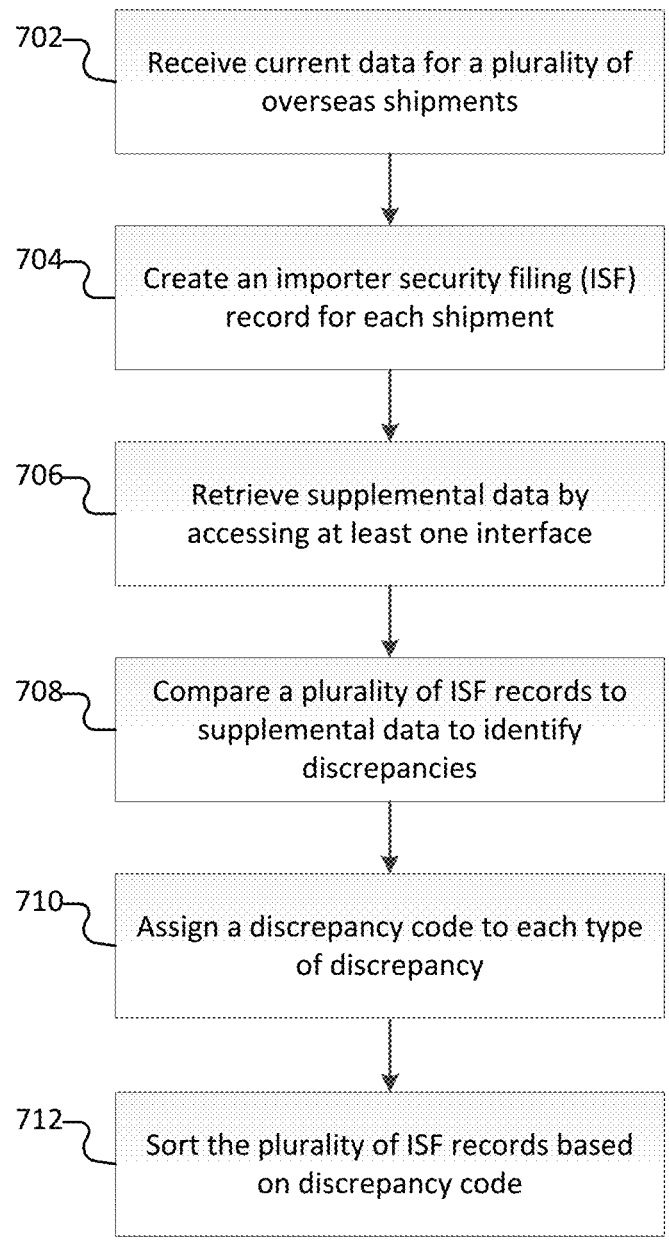
FIG. 7 provides a flow diagram of a method of improving accuracy and timeliness for submitting a plurality of ISFs.

Referring now to FIG. 7, which provides a flow diagram of a method of improving accuracy and timeliness for submitting a plurality of ISFs. For instance, the method of FIG. 7 may correspond to the system architecture for a customs compliance system described with respect to FIGS. 2 and 3.

At receive operation 702, current data for a plurality of overseas shipments may be received from an OTM API. The current data may include a number of details regarding each proposed shipment of goods, including a purchase order ("PO") number, a bill of lading ("BOL") number, one or more shipped item numbers, a shipped item quantity for each shipped item number, a "ship to" party, a vessel name, a "ship from" country, an overseas carrier, etc. Receipt of the current data may trigger an ISF workflow for each overseas shipment. For instance, the current data may be received and loaded into a software tool, such as the customs compliance tool 204/304, described above. In an example, the current data may include a BOL associated with one or more containers (e.g., a "Pre-Advanced Ship Notice," or "PreASN" container). Batching of PreASNs associated with a unique BOL/PO combination may be performed periodically, e.g., every hour, two hours, four hours, etc., or substantially continuously, e.g., as current data is received PreASNs may be batched with a BOL/PO combination. In response to batching the PreASNs, the ISF workflow may be triggered and an ISF record may be created at create operation 704.

At create operation 704, an importer security filing ("ISF") record may be created for each overseas shipment. For example, the ISF record may comprise data and information required for submitting an ISF to the U.S. Customs and Border Protection ("U.S. CBP"). However, as detailed above, the received current data may provide some but not all of the information required for a corresponding ISF. Additionally, at least some information provided by the OTM API may be outdated, incomplete, or inaccurate by the time of filing the ISFs. Accordingly, it is necessary to supplement each ISF record with additional, up-to-date data in order to comply with U.S. customs regulations.

At retrieve operation 706, supplemental data may be retrieved from one or more external sources using different application programming interfaces ("APIs"). In some cases, the external sources may be accessed directly via APIs; alternatively, the external sources may be accessed by an ISF processing manager, which may then provide the supplemental data to the customs compliance tool. The supplemental data may reflect the most up-to-date and accurate data available. For example, supplemental data may be retrieved from overseas vendors, for POs corresponding to PO numbers for each overseas shipment, and/or from overseas carriers associated with each overseas shipment.

At compare operation 708, the ISF records may be audited. As described above, auditing ISF records may involve retrieving supplemental data from external sources (e.g., via the one or more external interfaces) and comparing ISF record data with the retrieved supplemental data. When data within an ISF record does not match the supplemental data retrieved, the ISF record may be flagged as having a discrepancy. Additionally, during operation 708, each ISF record may be audited for improperly formatted data, incomplete or missing data, conflicting data, and the like.

At assign operation 710, a discrepancy code may be assigned to each discrepancy in each ISF record. In some aspects, discrepancy codes may correspond to U.S. CBP error codes. In other aspects, discrepancy codes may correspond to a proprietary list of discrepancies, or similar discrepancies may be grouped together. As should be appreciated, discrepancies may be assigned to discrepancy codes according to any suitable method.

At sort operation 712, the plurality of ISF records may be sorted by discrepancy code. For example, all ISF records having a missing consolidator may be sorted by discrepancy code and, as a result, accessing an external interface of the overseas consolidation center may yield current data for a set of ISF records all having the same missing information. In some cases, the ISF records may be sorted both by discrepancy code and by ISF submission deadline. In this way, ISF records having more urgent deadlines may be addressed first. Here again, the present methods improve customs compliance by handling multiple ISF records in a timely fashion. In this case, ISF records may be sorted by discrepancy code such that a group of ISF records having the same deficiency can be handled together, improving overall efficiency. Additionally, ISF records can be sorted by submission deadline, such that the most urgent ISF records are handled first, improving overall timeliness. Further, as described above, current data from external sources may be retrieved as needed, such that ISF records can be handled independently, improving both accuracy and timeliness. Thus, based on the presently described systems, ISF submission is improved with respect to timeliness, accuracy, and completeness.

As should be appreciated, operations 702-712 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 8:
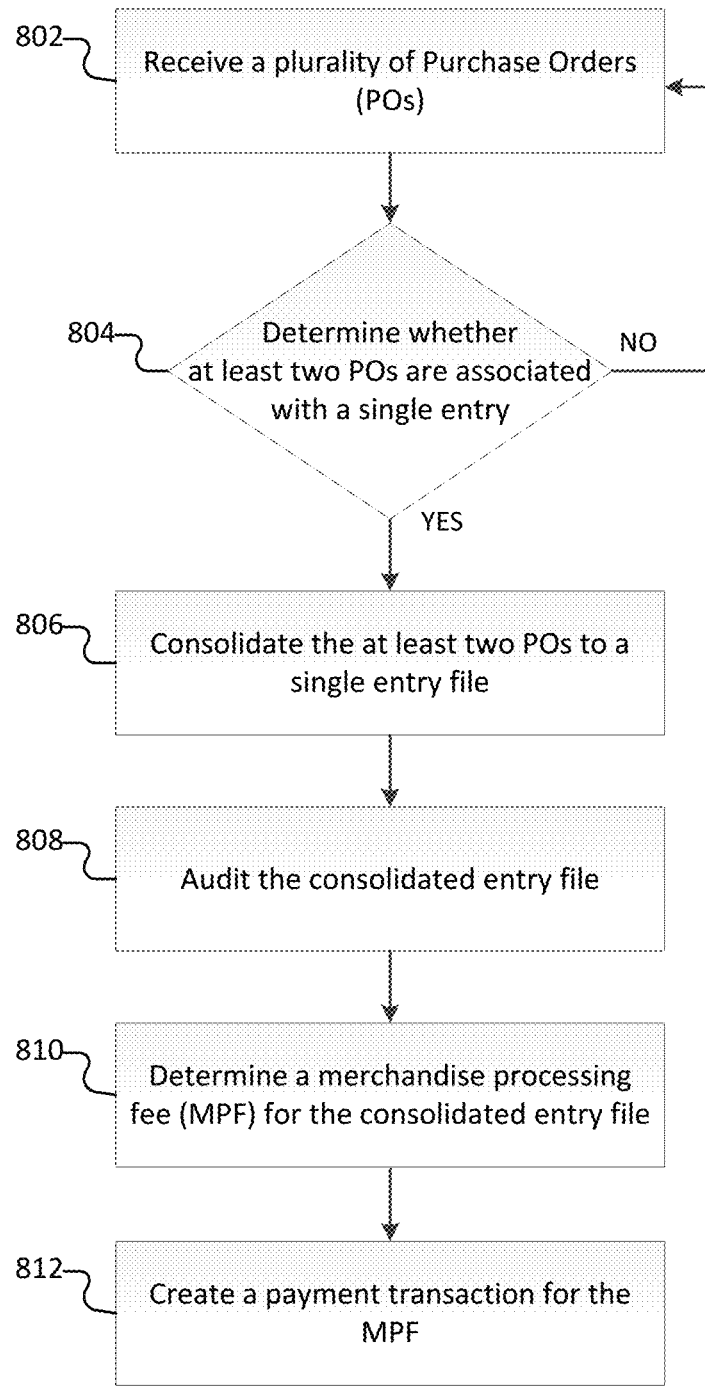
FIG. 8 provides a flow diagram of a method of consolidating a plurality of purchase orders (POs) to a single consolidated entry.

FIG. 8 provides a flow diagram of a method of consolidating a plurality of purchase orders (POs) to a single consolidated entry.

At receive operation 802, a plurality of purchase orders (POs) are received. A purchase order ("PO") is typically placed to request products from an overseas vendor. Each PO is associated with a bill of lading ("BOL") number, one or more shipped item numbers, a shipped item quantity for each shipped item number, a vessel name, a "ship from" country, a total value of goods, an overseas carrier, etc.

At determine operation 804, at least two of the plurality of POs may be determined to be associated with a single entry to the United States. For example, the at least two POs may be associated with the same vessel arriving at the same destination port at the same time ("ETA"). If it is determined that at least POs are associated with a single entry into the U.S., the method may progress to consolidate operation 806. If it is determined that at least two POs are not associated with a single entry to the U.S., an entry form may be generated for each PO of the plurality of POs and the method may return to receive operation 802.

At consolidate operation 806, the at least two POs are consolidated to a single entry file (e.g., EDI 7501). In aspects, the United States Customs and Boarder Protection ("CBP") may require importers to file form 7501 with every entry of goods into the U.S. EDI 7501 requires completion of a number of fields, including a filer code, an entry type, a bond type, a port code, an entry date, a country of origin, an importing carrier, an importer number, a total entered value, among others. When a plurality of POs are consolidated to a single entry file, the total entered value is a sum of the total value of goods for each PO. In further aspects, a merchandise processing fee ("MPF") may be charged for processing each entry file. However, the MPF may be capped for a total entered value over a predetermined amount. By consolidating multiple POs arriving on the same shipment under a single consolidated entry file, the maximum MPF is realized more often than if each PO were filed in a separate entry file. Thus, incremental savings may be realized for each consolidated entry file having a total entered value over the predetermined amount.

At audit operation 808, the consolidated entry file is audited to verify that the data has been correctly entered and that each PO is properly combined in the same entry file. For instance, verification of each PO associated with the consolidated entry form is performed to confirm that each PO is associated with the same entry data, including the same filer code; entry type; bond type; port code; entry date; country of origin; importing carrier; importer number, name and address; consignee number, name, and address; foreign port of lading; U.S. port of unlading; etc.

At operation 810, a merchandise processing fee ("MPF") is determined for the consolidated entry form. The MPF may be determined based on the total entered value of the consolidated entry form. That is, the total value of goods associated with each PO may be combined to generate the total entered value for the consolidated entry form. In at least some cases, the total entered value may be more than a predetermined amount and the MPF may be capped at a fixed fee for the consolidated entry form. In this way, by combining the at least two POs on a single consolidated entry form, the overall MPFs may be decreased. Conversely, if each PO had been filed via a separate entry form, the total value of goods associated with at least some of the individual POs may not exceed the predetermined amount and the MPF may not be capped for at least those entry forms. Thus, by filing the same POs on separate forms, additional MPFs may be incurred.

At operation 812, a payment transaction is created for paying the MPF.

As should be appreciated, operations 802-812 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed is:

1. A method for complying with customs regulations for an overseas shipment, the method comprising:
   receiving, at a software tool implemented on a computing system, current data comprising one or more of: a purchase order ("PO") number, a bill of lading ("BOL") number, one or more shipped item numbers, a shipped item quantity for each shipped item number, a ship to party, a vessel name, a ship from country, or an overseas carrier;
   creating an importer security filing ("ISF") record, the ISF record based at least in part on the current data, wherein the ISF record is one among a plurality of ISF records created in association with a plurality of overseas shipments;
   retrieving supplemental data from a plurality of external data sources by accessing at least one interface, wherein the supplemental data comprises one or more of:
      a PO corresponding to the PO number, the PO comprising one or more ordered item numbers and an ordered item quantity for each ordered item;
      supplemental data of an overseas vendor; or
      supplemental data of an overseas carrier;
   using an audit engine associated with the software tool, auditing record data of the plurality of ISF records, including the ISF record, by comparing each item of the plurality of ISF records to a plurality of supplemental data, including the supplemental data, the audit engine being associated with a rule table with one or more prioritization rules, wherein, for each item on the plurality of ISF records, the one or more prioritization rules associates each of the plurality of external data sources to a priority level;
   when a plurality of discrepancies between items of the plurality of ISF records and the plurality of supplemental data are identified by the audit engine, resolving the plurality of discrepancies by:
      identifying a type of discrepancy for each of the plurality of discrepancies;
      assigning a discrepancy code from among a plurality of discrepancy codes to each of the plurality of discrepancies, wherein the discrepancy code is based on the type of discrepancy;
      grouping items of the plurality of ISF records into groups based on the discrepancy codes such that discrepancies associated with a particular discrepancy code are resolved together; and
      for each group of items,
         applying the one or more prioritization rules associated with the group of items to identify an external data source among the plurality of external data sources that has a highest priority level for the item;
         retrieving near real time supplemental data from the external data source; and updating each of the plurality of ISF records associated with the group with the near real time supplemental data; and when the discrepancy between the record data and the supplemental data is resolved for the plurality of ISF records associated with the group, submitting the ISF records associated with the group to a U.S. customs authority.

2. The method of claim 1, wherein the supplemental overseas carrier data comprises on or more of:
an estimated time of departure ("ETD"); or
an estimated time of arrival ("ETA").

3. The method of claim 2, the method further comprising:
determining a deadline for submitting the ISF record based on the ETD; and
submitting the ISF record to the customs authority prior to the deadline.

4. The method of claim 1, wherein the supplemental overseas vendor data comprises one or more of:
a seller;
a manufacturer;
a country of origin for each shipped item;
a commodity number for each shipped item;
a consolidator; or
a consolidation location.

5. The method of claim 1, wherein the ISF record comprises at least:
a seller;
a buyer;
an importer of record number;
a consignee number;
a ship to party;
a manufacturer;
a country of origin for each shipped item;
a commodity number for each shipped item;
a consolidator; and
a consolidation location.

6. The method of claim 1, the method further comprising:
receiving a rejection of the ISF record from the U.S. customs authority; and
based on the rejection, retrieving additional current data by accessing the at least one interface.

7. The method of claim 1, wherein the auditing further comprises:
applying one or more rules to the record data; and
identifying the discrepancy between the record data and the supplemental data based on the one or more rules.

8. The method of claim 1, wherein, updating the ISF record includes resolving the discrepancy automatically or manually.

9. The method of claim 1, wherein the at least one interface comprise one or more of:
an Assortment application programming interface ("API");
an Item API;
a purchase order ("PO") API;
an overseas transport manager ("OTM") API; and
an ISF processing manager API.

10. The method of claim 9, wherein the OTM API and the ISF processing manager API are the same.

11. The method of claim 1, further comprising:
identifying ISF record submission deadlines for the plurality of ISF records; and
sorting groupings of the items of the plurality of ISF records based on the ISF record submission deadlines.

12. The method of claim 1, further comprising:
identifying a plurality of purchase orders associated with a single entry based on vessel name, destination port and estimated time of arrival;
creating a single entry file by consolidating the plurality of purchase orders;
using the audit engine, auditing the single entry file to verify that the plurality of purchase orders are properly combined into the single entry; and
creating a payment transaction for the single entry file.

13. A computing system for complying with customs regulations for an overseas shipment, the computing system comprising:
at least one processor communicatively coupled to at least one memory, the at least one memory storing computer-executable instructions comprising a software tool which, when executed, causes the computing system to:
receive current data comprising one or more of: a purchase order ("PO") number, a bill of lading ("BOL") number, one or more shipped item numbers, a shipped item quantity for each shipped item number, a ship to party, a vessel name, a ship from country, or an overseas carrier;
create an importer security filing ("ISF") record, the ISF record based at least in part on the current data, wherein the ISF record is one among a plurality of ISF records created in association with a plurality of overseas shipments;
retrieve supplemental data from a plurality of external data sources by accessing at least one interface, wherein the supplemental data comprises one or more of:
a PO corresponding to the PO number, the PO comprising one or more ordered item numbers and an ordered item quantity for each ordered item;
supplemental data of an overseas vendor; or
supplemental data of an overseas carrier;
using an audit engine associated with the software tool, audit record data of the plurality of ISF records, including the ISF record by comparing each item of the plurality of ISF records to a plurality of supplemental data, including the supplemental data, the audit engine being associated with a rule table with one or more prioritization rules, wherein for each item on the plurality of ISF records, the one or more prioritization rules associates the each of the plurality of external data sources to a priority level;
when a plurality of discrepancies between items of the plurality of ISF records and the supplemental data are identified by the audit engine, resolve the plurality of discrepancies by:
identifying a type of discrepancy for each of the plurality of discrepancies;
assigning a discrepancy code from among a plurality of discrepancy codes to each of the plurality of discrepancies, wherein the discrepancy code is based on the type of discrepancy;
grouping items of the plurality of ISF records into groups based on the discrepancy codes such that discrepancies associated with a particular discrepancy code are resolved together; and
for each group of items,
applying the one or more prioritization rules associated with the item to identify an external data source among the plurality of external data sources that has a highest priority level for the item;

retrieving near real time supplemental data from the external data source; and updating each of the plurality of ISF records associated with the group with the near real time supplemental data; and when the discrepancy between the record data and the supplemental data is resolved for the plurality of ISF records associated with the group, submit the ISF records associated with the group to a U.S. customs authority.

14. The computing system of claim 13, the computer-executable instructions further causing the computing system to:

receive a rejection of the ISF record from the U.S. customs authority; and based on the rejection, retrieve additional current data by accessing the at least one interface.

15. The computing system of claim 13, the computer-executable instructions further causing the computing system to:

apply one or more rules to the record data; and identify the discrepancy between the record data and the supplemental data based on the one or more rules.

16. The computing system of claim 15, the computer-executable instructions further causing the computing system to:

sort the plurality of ISF records based on an estimated time of departure ("ETD"); and resolve discrepancies associated with the plurality of ISF records having earlier ETDs before ISF records having later ETDs.

* * * * *